United States Patent Office 2,784,194
Patented Mar. 5, 1957

2,784,194

PHENACYLSULFONYL PYRIDINE COMPOUNDS

Moses Wolf Goldberg, Upper Montclair, and Sidney Teitel, Nutley, N. J., assignors to Hoffmann-La Roche Inc., Nutley, N. J., a corporation of New Jersey No Drawing. Application July 7, 1954,
Serial No. 441,950

8 Claims. (Cl. 260—294.8)

The subject matter of this invention relates to phenacyl sulfones. More particularly, this invention pertains to phenacylsulfonyl pyridine compounds and derivatives thereof.

The novel compounds are represented by the following structural formula

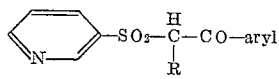

wherein R is a member of the group consisting of hydrogen and lower alkyl, and salts thereof. The "aryl" in the above formula refers to monocyclic aryl groups including phenyl and nuclearly substituted phenyl, such as halophenyl, hydroxyphenyl, alkoxyphenyl, acyloxyphenyl, cyanophenyl, nitrophenyl, aminophenyl, etc. The ring substituents of the alkoxyphenyl and acyloxyphenyl groups are preferably lower alkyl derivatives such as methoxyphenyl and acetoxyphenyl groups.

Salts of the novel compounds, such as the acid addition salts and quaternary salts, are particularly within the scope of this invention. These salts include acid addition salts, such as the hydrohalides, e. g. hydrochlorides, sulfates and toluenesulfonates, and quaternary salts, such as the lower alkyl halide, aryl halide and aralkyl halide quaternary salts.

The novel compounds of this invention are produced by reacting an alkali metal salt of 3-pyridinesulfinic acid with a phenacyl halide in an organic solvent such as ethanol, dimethylformamide, acetone, nitromethane, etc. The free base thus obtained may be converted into the acid addition salt by reacting the base in a solvent with a strong acid, such as a mineral acid. Quaternary salts are produced by reacting the free base in an organic solvent such as nitromethane, acetone, acetonitrile, ethanol, etc. with a quaternizing agent, such as an alkyl halide, an aralkyl halide, a phenacyl halide, etc.

3-pyridinesulfinic acid, which is a starting material for the compounds of this invention, is prepared by condensing 3-pyridinesulfonyl chloride with hydrazine to produce 3-pyridinesulfonic acid hydrazine and reacting the latter with acetone. By neutralizing an aqueous solution of 3-pyridinesulfinic acid with sodium hydroxide and evaporating the resulting solution, the sodium salt of 3-pyridinesulfinic acid is obtained.

The aminophenacyl sulfones of this class can be obtained, for example, by deacetylating the corresponding acetamidophenacyl sulfones with a strong aqueous acid. The hydroxyphenacyl sulfones are similarly obtained from the corresponding acetoxyphenacyl sulfones.

The compounds of this invention are useful as anthelmintics; for example, they are active against worms of the family oxyuridae.

Example 1

19.9 grams (0.12 mol) of the dry sodium salt of 3-pyridinesulfinic acid and 18.6 grams (0.12 mol) of phenacyl chloride, dissolved in 200 ml. of absolute ethanol, were refluxed for 15 hours. The mixture was then cooled. The reaction product was filtered off and extracted in a Soxhlet apparatus with methanol. The methanol extract was concentrated to a small volume, cooled, and the crystals which had formed were filtered off and dried. The phenacyl 3-pyridyl sulfone was recrystallized from benzene and melted at 106–107° C.

Calculated for $C_{13}H_{11}NO_3S$: C, 59.76; H, 4.24. Found: C, 59.80; H, 4.35.

Example 2

9.1 grams (0.035 mol) of phenacyl 3-pyridyl sulfone were dissolved in 200 ml. of ice cold acetone containing 40% methyl bromide by weight. The solution, in a tightly stoppered flask, was allowed to warm slowly to room temperature and then was stored overnight. The crystals which had formed were filtered off, washed with acetone and dried. The 1-methyl-3-phenacylsulfonylpyridinium bromide, upon recrystallization from acetonitrile-acetone-ether, melted at 124–127° C.

Calculated for $C_{14}H_{14}BrNO_3S$: C, 47.22; H, 3.96. Found: C, 47.46; H, 4.30.

Example 3

To 12 grams (0.046 mol) of phenacyl 3-pyridyl sulfone dissolved in 75 ml. of nitromethane were added 25 grams (0.23 mol) of ethyl bromide. The solution was heated in a sealed tube at 65° for 16 hours and then cooled. The volatiles were distilled off. The residue was crystallized from ethanol-ether. The 1-ethyl-3-phenacylsulfonylpyridinium bromide melted at 163–164° C. with decomposition.

Calculated for $C_{15}H_{16}BrNO_3S$: C, 48.66; H, 4.36. Found: C, 48.30; H, 4.37.

Example 4

To a suspension of 12 grams (0.046 mol) of phenacyl 3-pyridyl sulfone in 75 ml. of nitromethane were added 13.7 ml. (0.15 mol) of n-propyl bromide. The suspension was heated in a sealed tube at 65° C. for 15 hours. The resulting solution was cooled and the volatiles were distilled off. The residual solid, 1-propyl-3-phenacylsulfonylpyridinium bromide was recrystallized from 95% ethanol-ether, M. P. 181–182° C. with decomposition.

Calculated for $C_{16}H_{18}BrNO_3S$: C, 50.01; H, 4.72. Found: C, 49.99; H, 4.88.

Example 5

To a suspension of 12 grams (0.046 mol) of phenacyl 3-pyridyl sulfone in 75 ml. of nitromethane were added 16 ml. (0.15 mol) of n-butyl bromide. The suspension was heated in a sealed tube at 65° C. for 15 hours. The resulting solution was cooled and the volatiles were distilled off. The residual solid, 1-butyl-3-phenacylsulfonylpyridinium bromide hemihydrate, was recrystallized from ethanol-methyl ethyl ketone, M. P. 164–166° C. with decomposition.

Calculated for $C_{17}H_{20}BrNO_3S.1/2H_2O$: C, 50.14; H, 5.19. Found: C, 49.92; H, 4.87.

Example 6

To a suspension of 12 grams (0.046 mol) of phenacyl 3-pyridyl sulfone in 75 ml. of nitromethane were added 16 ml. of n-amyl bromide. The suspension was heated in a sealed tube at 65° for 15 hours. The resulting solution was cooled and the volatiles were then distilled off. The residual solid was recrystallized from ethanol-methyl ethyl ketone-ether. The 1-amyl-3-phenacylsulfonylpyridinium bromide melted at 120–122° C.

Calculated for $C_{18}H_{22}BrNO_3S$: C, 52.43; H, 5.38. Found: C, 52.71; H, 5.14.

Example 7

10.2 grams (0.038 mol) of phenacyl 3-pyridyl sulfone were dissolved in 150 ml. of acetonitrile. To the solution were added 8.3 grams (0.038 mol) of p-nitrobenzyl bromide. The mixture was stirred and refluxed for 8 hours and cooled. The crystals were filtered off, washed with acetonitrile and dried. The p-nitrobenzyl bromide of phenacyl 3-pyridyl sulfone hemihydrate was recrystallized from water-acetonitrile-ether, M. P. 178–180° C. with decomposition.

Calculated for $C_{20}H_{17}BrN_2O_5S.1/2H_2O$: C, 49.40; H, 3.73. Found: C, 49.72; H, 3.75.

Example 8

To a suspension of 17 grams (0.065 mol) of phenacyl 3-pyridyl sulfone in 75 ml. of nitromethane were added 12 grams (0.078 mol) of phenacyl chloride. The suspension was heated in a sealed tube at 65° C. for 16 hours. The resulting solution was cooled and the volatiles were distilled off. The residual solid was recrystallized from ethanol-ether and the 1-phenacyl-3-phenacylsulfonylpyridinium chloride melted at 195–197° C. with decomposition.

Calculated for $C_{21}H_{18}ClNO_4S$: C, 60.66; H, 4.36. Found: C, 60.60; H, 4.52.

Example 9

To a well stirred suspension of 28.6 grams (0.2 mol) of 3-pyridinesulfinic acid in 250 ml. of absolute ethanol were added 12 grams of sodium methoxide (85%). To the resulting neutral solution were added 42.6 grams (0.2 mol) of α-bromopropiophenone. After 5 minutes of refluxing, the solution became turbid. The mixture was stirred and refluxed for 15 hours, then filtered while hot. The filtrate was concentrated in vacuo to remove the volatiles. The residual gum was washed with water and then crystallized from ethanol-isopropanol. The α-methylphenacyl 3-pyridyl sulfone melted at 81–82° C.

Calculated for $C_{14}H_{13}NO_3S$: C, 61.08; H, 4.76. Found: C, 61.36; H, 4.62.

Example 10

50 ml. of acetone, containing 40% by weight of methyl bromide, were added to 15 grams (0.055 mol) of α-methylphenacyl 3-pyridyl sulfone, dissolved in 100 ml. of ice cold acetone. The solution, in a tightly stoppered flask, was allowed to warm slowly to room temperature, then was stored overnight. The semicrystalline solid which had formed was filtered off and crystallized from acetonitrile-ether. The 1-methyl-3-(α-methylphenacylsulfonyl)pyridinium bromide melted at 179–180° C. with decomposition.

Calculated for $C_{15}H_{16}BrNO_3S$: C, 48.66; H, 4.36. Found: C, 48.81; H, 4.11.

Example 11

18 grams (0.12 mol) of 3-pyridinesulfinic acid were reacted with 33 grams (0.12 mol) of p-bromophenacyl bromide according to the procedure described in Example 9. The p-bromophenacyl 3-pyridyl sulfone, recrystallized from dimethylformamide-water, melted at 146–148° C. with decomposition.

Calculated for $C_{13}H_{10}BrNO_3S$: C, 45.88; H, 2.96. Found: C, 45.80; H, 2.88.

Example 12

50 ml. of acetone, containing 40% methyl bromide by weight, were added to 10.2 grams (0.03 mol) of p-bromophenacyl 3-pyridyl sulfone dissolved in 50 ml. of dimethylformamide. The solution was stored in a tightly stoppered flask at room temperature for 72 hours. The volatiles were distilled off and the residue was crystallized from 95% ethanol. The 1-methyl-3-(p-bromophenacyl sulfonyl)pyridinium bromide melted at 133–134° C. with decomposition.

Calculated for $C_{14}H_{13}Br_2NO_3S$: C, 38.64; H, 3.01. Found: C, 38.68; H, 3.19.

Example 13

To 2.98 grams (0.13 mol) of sodium, dissolved in 200 ml. of absolute ethanol, were added 18.7 grams (0.13 mol) of 3-pyridinesulfinic acid and 24 grams (0.13 mol) of p-methoxyphenacyl chloride. The mixture was stirred and refluxed for 15 hours, filtered while hot, and the crystalline residue was washed thoroughly with water and air dried. The p-methoxyphenacyl 3-pyridyl sulfone thus obtained melted at 106–108° C.

An ice cold suspension of 20.6 grams of the product obtained in the preceding paragraph was treated with 200 ml. of acetone, containing 40% methyl bromide by weight. The mixture was heated in a sealed tube at 100° for 8 hours and then cooled. The crystals obtained were filtered off, washed with acetone and dried. The 1-methyl-3-(p-methoxyphenacylsulfonyl)pyridinium bromide, upon recrystallization from methanol-ether, melted at 183–185° C.

Calculated for $C_{15}H_{16}BrNO_4S$: C, 46.63; H, 4.18. Found: C, 46.69; H, 4.49.

Example 14 p-Acetoxyphenacyl bromide was prepared by slowly adding 22 grams of bromine to a solution of 24.7 grams of p-acetoxyacetophenone in 100 ml. of absolute ether containing 0.2 gram of anhydrous aluminum chloride. The volatiles were then distilled off in vacuo and the residue triturated with water and petroleum ether. The product was then filtered off and crystallized from ether-petroleum ether, M. P. 65–67° C.

11.5 grams (0.08 mol) of 3-pyridinesulfinic acid and 20 grams (0.078 mol) of p-acetoxyphenacyl bromide were reacted according to the procedure described in Example 9. The reaction product, p-acetoxyphenacyl 3-pyridyl sulfone, was recrystallized from acetone-ether, M. P. 128–129° C.

Calculated for $C_{15}H_{13}NO_5S$: C, 56.41; H, 4.10. Found: C, 56.34; H, 4.07.

1-methyl-3-(p-acetoxyphenacylsulfonyl)pyridinium bromide, M. P. 78–80° C., was prepared by the procedure described in Example 10 from 14 grams (0.044 mol) of p-acetoxyphenacyl 3-pyridyl sulfone and methyl bromide. The product was recrystallized from acetonitrile-ethyl acetate.

Calculated for $C_{16}H_{16}BrNO_5S$: C, 46.39; H, 3.89. Found: C, 46.64; H, 4.12.

Example 15

To 17 grams (0.036 mol) of 1-methyl-3-(p-acetoxyphenacylsulfonyl)pyridinium bromide, dissolved in 100 ml. of water, were added 15 ml. of 48% hydrobromic acid. The solution was refluxed for 3 hours. The volatiles were distilled off and the residue was crystallized from water-ethanol. The 1-methyl-3-(p-hydroxyphenacylsulfonyl)-pyridinium bromide melted at 207–208° C. with decomposition.

Calculated for $C_{14}H_{14}BrNO_4S$: C, 45.18; H, 3.79. Found: C, 45.31; H, 4.07.

Example 16 p-Cyanophenacyl bromide was prepared by slowly adding 34 grams of bromine to a solution of 34 grams of p-cyanoacetophenone in 100 ml. of absolute ether containing 0.3 gram of anhydrous aluminum chloride. The volatiles were then distilled off in vacuo, the residue triturated with water and crystallized from ethanol, M. P. 90–92° C.

28.6 grams (0.2 mol) of 3-pyridinesulfinic acid and 44.8 grams (0.2 mol) of p-cyanophenacyl bromide were reacted according to the procedure described in Example 9. The reaction product, p-cyanophenacyl 3-pyridyl sulfone was recrystallized from 60% ethanol, M. P. 169–170° C.

Calculated for $C_{14}H_{10}N_2O_3S$: C, 58.73; H, 3.52. Found: C, 58.56; H, 3.82.

By proceeding in the manner described in Example 10, 1-methyl-3-(p-cyanophenacylsulfonyl)pyridinium bromide, M. P. 206–207° C. with decomposition, was prepared by reacting 13 grams (0.045 mol) of p-cyanophenacyl 3-pyridyl sulfone with methyl bromide. The product was recrystallized from water-ethanol.

Calculated for $C_{15}H_{13}BrN_2O_3S$: C, 47.25; H, 3.44. Found: C, 47.47; H, 3.71.

*Example 17*

14.3 grams (0.1 mol) of 3-pyridinesulfinic acid and 24.4 grams (0.1 mol) of p-nitrophenacyl bromide were reacted according to the procedure described in the first paragraph of Example 13 to produce p-nitrophenacyl 3-pyridyl sulfone, M. P. 144–146° C. The product was recrystallized from acetonitrile-ethanol.

Calculated for $C_{13}H_{10}N_2O_5S$: C, 50.98; H, 3.29. Found C, 51.33; H, 3.58.

To a suspension of 9.2 grams (0.03) of p-nitrophenacyl 3-pyridyl sulfone in 100 ml. of acetonitrile were added 100 ml. of acetone containing 40% methyl bromide by weight. The mixture was heated in a sealed tube at 100° C. for 8 hours. The mixture was cooled, the crystals were filtered off, washed with acetone and dried. The 1-methyl-3-(p-nitrophenacylsulfonyl)pyridinium bromide, recrystallized from 80% ethanol, melted at 195–196° C. with decomposition.

Calculated for $C_{14}H_{13}BrN_2O_5S$: C, 41.92; H, 3.27. Found: C, 41.89; H, 3.19.

*Example 18*

28.6 grams (0.2 mol) of 3-pyridinesulfinic acid were reacted with 42.4 grams (0.2 mol) of p-acetamido-α-chloroacetophenone according to the procedure described in the second paragraph of Example 14. The p-acetamidophenacyl 3-pyridyl sulfone, upon recrystallization from 60% ethanol, melted at 196–197° C. with decomposition.

By reacting 24.8 grams (0.078 mol) of p-acetamidophenacyl 3-pyridyl sulfone and methyl bromide in dimethylformamide according to the procedure described in Example 12, 1-methyl-3-(p-acetamidophenacylsulfonyl)pyridinium bromide, M. P. 209–210° C. with decomposition, was obtained. The product was recrystallized from water-methanol-acetone.

Calculated for $C_{16}H_{17}BrN_2O_4S$: C, 46.49; H, 4.15. Found: C, 46.34; H, 4.34.

1-methyl-3-(p-aminophenacylsulfonyl)pyridinium bromide hydrobromide, M. P. above 330° C., was prepared by deacetylating 15 grams (0.036 mol) of 1-methyl-3-(p-acetamidophenacylsulfonyl)pyridinium bromide with 15 ml. of 48% hydrobromic acid according to the procedure described in Example 15. The product was recrystallized from water-methanol-acetonitrile.

Calculated for $C_{14}H_{15}BrN_2O_3S \cdot HBr$: C, 37.19; H, 3.57. Found: C, 37.25; H, 3.95.

We claim:

1. A compound selected from the group consisting of bases having the formula

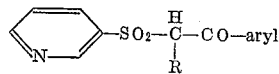

wherein R represents a member of the group consisting of hydrogen and lower alkyl, and aryl represents a member of the group consisting of phenyl, bromophenyl, hydroxyphenyl, lower-alkoxyphenyl, lower-alkanoic acid acyloxyphenyl, cyanophenyl, nitrophenyl and aminophenyl, and pharmaceutically acceptable acid addition salts and quaternary salts of said bases.

2. Phenacyl 3-pyridyl sulfone.

3. Pharmaceutically acceptable quaternary salts of a compound according to claim 2.

4. p-Acetoxyphenacyl 3-pyridyl sulfone.

5. Pharmaceutically acceptable quaternary salts of a compound according to claim 4.

6. 1-butyl-3-phenacylsulfonylpyridinium bromide.

7. 1-amyl-3-phenacylsulfonylpyridinium bromide.

8. 1-methyl-3-(p-acetoxyphenacylsulfonyl)pyridinium bromide.

No references cited.